United States Patent
Caputo, II et al.

(10) Patent No.: US 9,088,508 B1
(45) Date of Patent: Jul. 21, 2015

(54) INCREMENTAL APPLICATION OF RESOURCES TO NETWORK TRAFFIC FLOWS BASED ON HEURISTICS AND BUSINESS POLICIES

(71) Applicant: Level 3 Communications, LLC, Broomfield, CO (US)

(72) Inventors: Pete Joseph Caputo, II, Highlands Ranch, CO (US); William Thomas Sella, Parker, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

(21) Appl. No.: 14/251,049

(22) Filed: Apr. 11, 2014

(51) Int. Cl.
| | |
|---|---|
| H04L 12/26 | (2006.01) |
| H04L 12/56 | (2006.01) |
| H04L 1/00 | (2006.01) |
| G06F 11/00 | (2006.01) |
| G06F 11/07 | (2006.01) |
| G06F 12/14 | (2006.01) |
| G06F 21/22 | (2006.01) |
| H04L 12/851 | (2013.01) |

(52) U.S. Cl.
CPC ...................................... H04L 47/24 (2013.01)

(58) Field of Classification Search
CPC ............ H40L 63/1416; H40L 63/1458; H40L 63/1408; H40L 63/0263; H40L 63/20; H04L 69/22; H04L 47/20; H04L 43/022; H04L 43/13; H04L 63/1441; H04L 63/1458; H04L 63/1408; H04L 63/0227; H04L 67/2814
USPC .......................... 370/229–253; 709/223–225; 726/22–23, 11, 13, 24
See application file for complete search history.

(56) References Cited

U.S. PATENT DOCUMENTS

| | | | |
|---|---|---|---|
| 7,331,060 B1 * | 2/2008 | Ricciulli | 726/22 |
| 7,447,152 B2 * | 11/2008 | Kim et al. | 370/231 |
| 7,624,447 B1 * | 11/2009 | Horowitz et al. | 726/23 |
| 8,209,756 B1 * | 6/2012 | Guruswamy et al. | 726/23 |
| 8,220,055 B1 * | 7/2012 | Kennedy | 726/25 |
| 8,266,267 B1 * | 9/2012 | Guruswamy et al. | 709/223 |
| 8,781,787 B2 * | 7/2014 | Hayashi et al. | 702/150 |
| 2002/0133586 A1 * | 9/2002 | Shanklin et al. | 709/224 |
| 2003/0145226 A1 * | 7/2003 | Bruton et al. | 713/201 |
| 2003/0188189 A1 * | 10/2003 | Desai et al. | 713/201 |
| 2004/0030776 A1 * | 2/2004 | Cantrell et al. | 709/224 |
| 2004/0054924 A1 * | 3/2004 | Chuah et al. | 713/201 |
| 2005/0125195 A1 * | 6/2005 | Brendel | 702/182 |
| 2006/0288413 A1 * | 12/2006 | Kubota | 726/23 |
| 2007/0044155 A1 * | 2/2007 | Pletka et al. | 726/25 |
| 2007/0195698 A1 * | 8/2007 | Briscoe et al. | 370/235 |
| 2008/0101234 A1 * | 5/2008 | Nakil et al. | 370/235 |
| 2009/0232000 A1 * | 9/2009 | Watanabe et al. | 370/235 |

(Continued)

*Primary Examiner* — Wutchung Chu

(57) ABSTRACT

Disclosed herein are system, method, and computer program product embodiments for increasingly applying network resources to traffic flows based on heuristics and policy conditions. A network determines that a traffic flow satisfies a first condition and transmits a first portion of the traffic flow to a network service. A network service then inspects the first portion of the traffic flow at a first level of detail and determines that the traffic flow satisfies a second condition. The network can then transmit a second portion of the traffic flow to the network service based on the determining the traffic flow satisfies the second condition. The network service can inspect the second portion of the traffic flow at a second level of detail, wherein the inspecting at the second level of detail requires a different amount of computing resources than the inspecting at the first level of detail.

19 Claims, 5 Drawing Sheets

(56) References Cited

U.S. PATENT DOCUMENTS

2011/0199902 A1* 8/2011 Leavy et al. .................. 370/232
2012/0014282 A1* 1/2012 Pappu et al. .................. 370/253
2012/0291125 A1* 11/2012 Maria ............................. 726/22
2013/0077486 A1* 3/2013 Keith ......................... 370/230.1
2013/0094356 A1* 4/2013 Keith et al. .................... 370/229
2013/0167219 A1* 6/2013 Jung et al. ....................... 726/13

* cited by examiner

INCREMENTAL APPLICATION OF RESOURCES TO NETWORK TRAFFIC FLOWS BASED ON HEURISTICS AND BUSINESS POLICIES

BACKGROUND

1. Technical Field

Embodiments generally relate to network services.

2. Background

In addition to routing data from one location to another, modern data networks provide personalized services. For example, many networks provide intrusion detection services that inspect sequences of packets to detect and prevent network attacks. Providing these services may require changes to routing of traffic flow. For example, traffic may be routed through a particular device that provides the service.

Traditional routing algorithms rely on local information each router has from its neighboring links and devices to route data. A router maintains such information in a routing table. Based on the destination address of an incoming packet, a router uses its routing table to forward the packet to a specific neighboring device.

A technique, referred to as Software Defined Networks (SDNs), separates the control and forwarding functions into separate devices. A control device may use a global knowledge of the network topology to determine a path through the network of forwarding devices for individual data flows. In this way, the control device may, for example, establish paths that minimize delay or maximize bandwidth through the network, or route a data flow through a particular device that provides a particular network service.

Routing data flows through network services introduces performance concerns. For example, intrusion detection systems may perform complex operations to detect attack patterns. These operations may increase latency and decrease bandwidth or may consume expensive network resources.

SUMMARY

In view of the above, it would be advantageous to provide a mechanism for providing increased application of network resources to traffic flows based on heuristics and policy conditions.

In an embodiment, a system determines that a traffic flow in a network satisfies a first condition and transmits a first portion of the traffic flow to a network service. A network service then inspects the first portion of the traffic flow at a first level of detail and determines that the traffic flow satisfies a second condition. The network can then transmit a second portion of the traffic flow to the network service based on the determining the traffic flow satisfies the second condition. The network service can inspect the second portion of the traffic flow at a second level of detail, wherein the inspecting at the second level of detail requires a different amount of computing resources than the inspecting at the first level of detail.

Method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

In embodiments, network resources are increasingly applied to traffic flows based on heuristics and policy conditions. In an example, a lightweight network service first examines a small portion of a data flow. The lightweight network service may examine the portion of the data flow using a technique that uses limited computing resources. The lightweight service may examine the data flow to determine whether the data stream needs more detailed examination. Only if the network service determines that a more detailed examination is required, the entire data flow may be examined using a technique that requires more computing resources, and adds more to latency, or higher cost.

To apply increasing resources in this way, a network client may configure preferences or policies for network connections with other clients or services. For example, a client may provide a policy specifying that a particular type of traffic with a particular party be monitored by an intrusion detection system. In embodiments, a network can monitor traffic to and from the client to detect whether the traffic meets the policy conditions and, if it does, routes the portion of the traffic (or microflow) meeting the conditions through an intrusion detection system. For example, the network may route packets of the particular type and directed to the particular party through the intrusion detection system. Embodiments can also increase the amount of the flow inspected and the level of inspection based on policies and heuristics. In this manner, the network can provide economical handling of network traffic by increasingly applying network resources to traffic flows.

Figure 1:
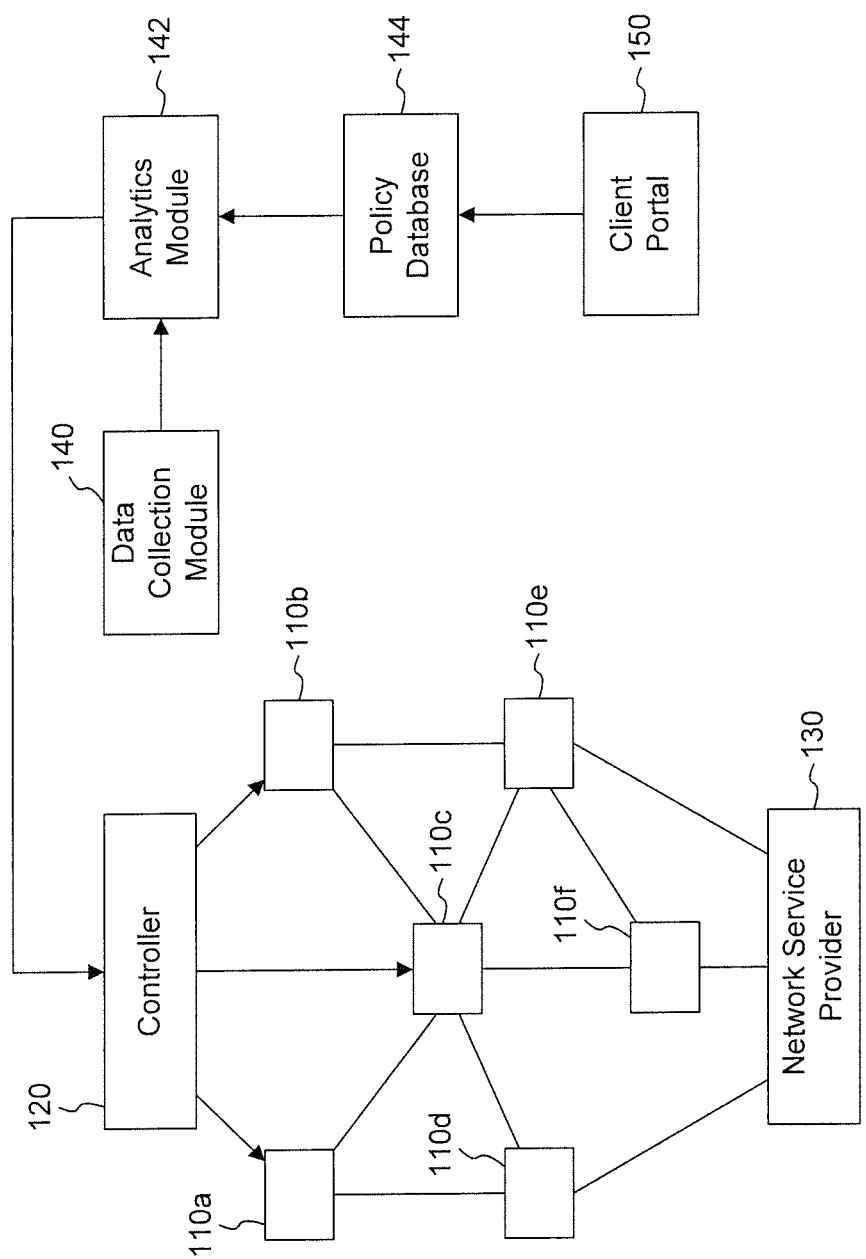
FIG. 1 shows a block diagram of a network configured to apply increasing network resources, according to an embodiment.

FIG. 1 shows a block diagram of a network 100 that increasingly applies network resources to traffic flows, according to an embodiment.

Network 100 can be a traffic network configured to transmit data between client computing devices, such as, for example, personal computers, servers, mobile devices, local area networks (LANs), etc. In an embodiment, network 100 is a wide area network (WAN) or a metropolitan area network (MAN). In an embodiment, network 100 provides virtual networking services, such as, for example, virtual local area networks (VLANs), virtual private networks (VPNs), etc. In an embodiment, network 100 provides Ethernet connectivity between clients in remote locations. For example, network 100 can provide a virtual circuit with dedicated bandwidth for data communications between clients in remote locations. Network 100 may utilize any point-to-point, point-to-multipoint, or multipoint-to-multipoint networking protocols. Network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), Transmission Control Protocol (TCP), User Datagram Protocol (UDP), Multiprotocol Label Switching (MPLS), etc.

In an embodiment, network 100 includes routers 110a-f, a controller 120, a network service provider 130, a data collection module 140, an analytics module 142, a policy database 144, and a client portal 150. Each component is described in turn below. Each of routers 110a-f may be a layer 2 or layer 3 device that forwards packets.

Controller 120 may configure routers 110a-f to route data based on, for example, client preferences, network policies, or heuristics. For example, controller 120 can configure the routing tables of routers 110a-f to create a virtual circuit between two clients. Controller 110 can communicate with analytics module 142 to make decisions on how to configure routers 110a-f.

Network service provider 130 may be a computing device configured to perform services on traffic flows. For example, network service provider 130 may be an intrusion detection system, firewall service, anti-virus system, anti-spam filter, etc., that can monitor, analyze, block, duplicate, or modify the packets of the traffic flow. In an embodiment, network service provider 130 is part of network 100. In another embodiment, network service provider 130 is independently provided by an external third-party in communication with network 100 via, for example, the Internet.

In an embodiment, controller 120 configures routers to route a traffic flow, or portions of a traffic flow, through network service provider 130. For example, a first party may wish to establish a traffic flow to communicate with a second party, but may wish to have the flow monitored by an intrusion detection system. Controller 120 may configure a set of routers to carry the traffic flow between the parties and to include service provider 130 in the route. In an embodiment, controller 120 may employ heuristics based on data gathered from the network to configure traffic flow routes and network services applied to the flows.

Data collection module 140 may collect data from the network flows based on policies associated with the flows and forwards the data to analytics module 142 for analysis. In an embodiment, a router 110 (e.g., any router 110a-f) may detect a new data flow. When a packet from a new data flow is detected, the router may forward the packet, including both its header and its contents, to data collection module 140.

Data gathering may depend on an amount of scrutiny desired for a particular flow. For example, a policy may specify a level of analysis for a flow, and data collection module 140 may gather information from packets based on the specified level of analysis. In one example, data collection module 140 gathers just the packet headers for a flow at an inspection level indicating moderate trust for the flow. In another example, data collection module 140 samples a subset of the headers at a lower inspection level indicating a higher level of trust for the flow. In yet another example, for a flow being inspected in more detail, data collection module 140 may collect the entire flow. In this manner, the level of detail of data collection and analysis can be adjusted based on analysis of the flow, as further explained below.

Analytics module 142 may analyze the data gathered by data collection module 142 to detect conditions that may trigger policy conditions or security flags. To detect the conditions, analytics module 142 gathers policy information from policy database 144.

Policy database 144 may store policies associated with, for example, network clients, source and destination addresses, applications, etc. In an embodiment, a client specifies policies associated to its traffic flows. For example, a client and a server may communicate through network 100. The client may specify that it wants its HTTP traffic with the server to be monitored by an intrusion detection system. Policy database 144 may also store policies based on heuristics. For example, a network manager may wish to evaluate anomalous traffic more closely than other traffic. The manager may establish a heuristics-based policy that states that a flow whose average packet size exceeds a certain threshold should be forwarded through an intrusion detection system for closer examination.

Using the policies in policy database 144, analytics module 142 may evaluate the flow data obtained from data collection module 140 to determine whether any policies are satisfied. If any conditions are satisfied, analytics module 142 may communicate with controller 120 and instruct it to configure routers 110a-f to route traffic in compliance with the satisfied policy. For example, if analytics module 142 detects a traffic flow's average packet size exceeds a threshold established by a heuristics-based rule, analytics module 142 can notify controller 110, which in turn can configure routers to forward the flow through network service provider 130 for monitoring by an intrusion detection system.

Client portal 150 may receive policies and configuration information from network clients. In an embodiment, client portal 150 provides a user interface, such as a web interface, to clients where clients can provide policies and configuration information for their network communications. In another embodiment, client portal 150 may provide application program interfaces that enable clients to provide policies and configuration information for their network communications.

Client portal 150 may receive high-level indications of the security or performance desired for a particular flow, client, party, application, etc. Based on these indications, client portal 150 can configure policies in policy database 144. In another embodiment, client portal 150 receives detailed policies of the inspection level or intrusion detection analysis desired for a particular flow.

Figure 2:
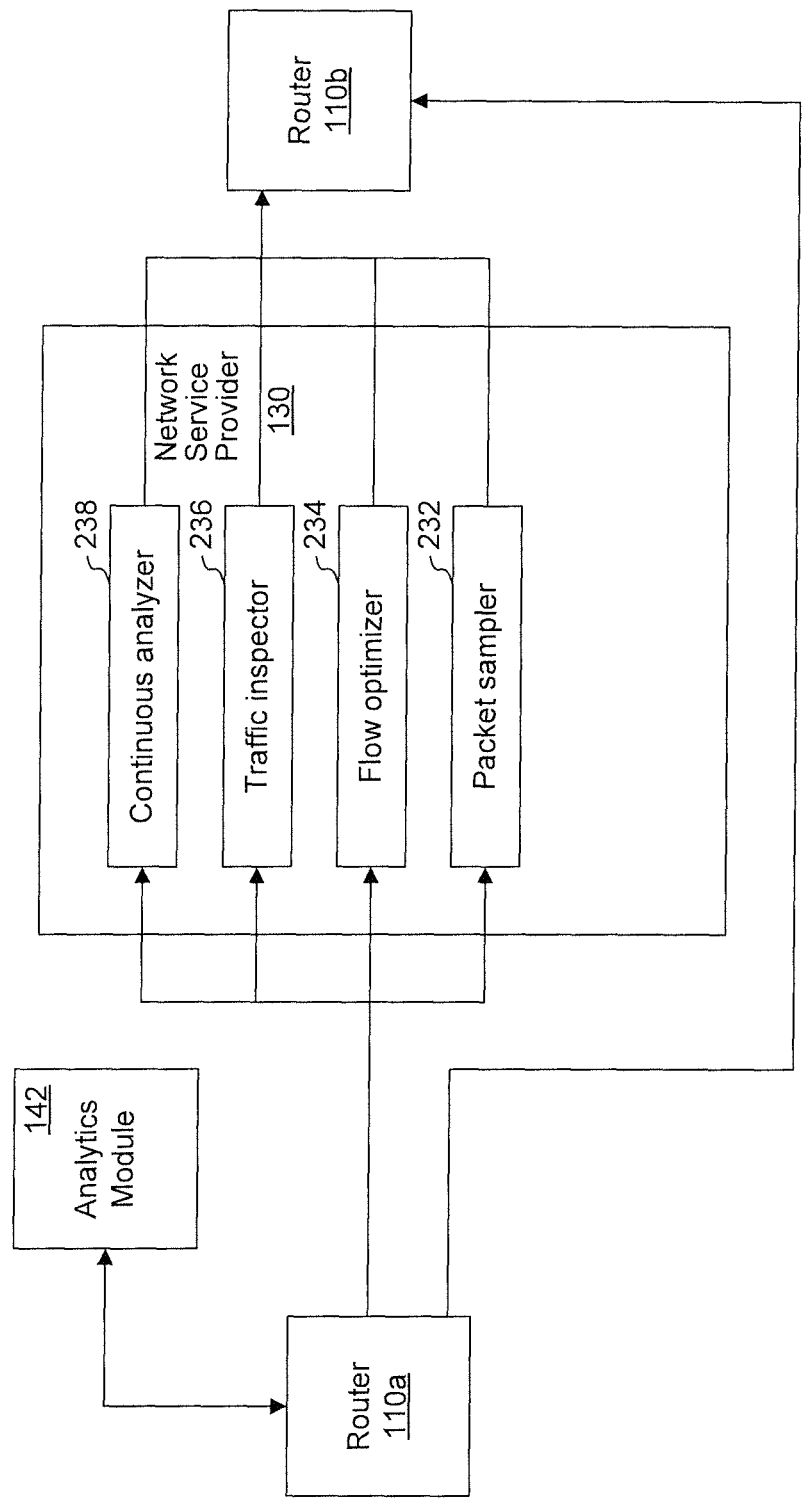
FIG. 2 shows a block diagram illustrating further details of a system providing increased application of network resources to network flows, according to an embodiment.

FIG. 2 shows a block diagram illustrating further details of a system providing increased application of network resources to network flows, in accordance to an example embodiment.

A flow may be configured to travel through routers 110a and 110b. FIG. 2 illustrates how the flow may be handled based on the inspection level determined for the flow, according to an example embodiment.

In an embodiment, routers 110 can detect new flows and perform flow analysis and route flows to a corresponding module. In an embodiment, a router 110 detects a packet from a new flow and forwards the packet to data collection module 140 for analysis by analytics module 142. Analytics module 142 can provide analysis instructions to controller 120, for example, by providing an inspection level for a flow. Controller 120 can then configure routers 110 to route flows based on their respective inspection levels.

In an embodiment, routers 110 may be configured to perform heuristics analysis of metadata about flows. For example a router 110, such as router 110a, may be configured to monitor the average packet size of flows. If the average packet size deviates from a specified range, router 110a can forward packets from the flow to data collection module 140, and analytics module 142 may determine whether to increase the inspection level of the flow.

In an embodiment, controller 120 may configure routers 110 to route a microflow of the flow's packets to service provider 130 based on the inspection level of the flow. For example, for a flow at a first inspection level, router 110*a* may be configured to not route any packets through provider 130 and may perform a heuristics analysis of the flow metadata and route the flow directly to router 120*b*. In this way, the first level of inspection may be conducted at router 110*a*.

Beyond the first level of analysis, to conduct the different levels of inspection, the packets may be transmitted to various modules provided by service provider 130: a packet sampler module 232, a flow optimizer module 234, a traffic sampler module 236, and a continuous analyzer 238.

In particular, at a second inspection level, router 110*a* may be configured to route a microflow comprised of samples of the packet headers (e.g., randomized header samples) to network service provider 130 for analysis. A packet sampler module 232 at provider 130 can then analyze this microflow. At a third inspection level, router 110*a* may be configured to route a microflow comprised of the packet headers to provider 130, in which a flow optimizer module 234 can analyze the microflow. At a fourth inspection level, router 110*a* may be configured to route a microflow comprised of packets including header and contents through provider 130, in which a traffic inspector module 236 can analyze the microflow. At a fifth inspection level, router 110*a* may be configured to route an entire flow through provider 130, in which a continuous analyzer 238 can analyze the flow. The inspection levels and microflows described are merely examples meant to illustrate the functionality of embodiments of network 100, and other examples suitable for different methods of packet flow analysis will be appreciated by those skilled in the relevant arts.

Provider 130 can perform analysis of the microflows, such as, for example, intrusion detection, firewall, anti-spam filtering, etc. Provider 130 can then perform other actions with the flow depending on the results of the analysis, such as, for example, blocking packets that are determined to pose security risks, sending an alert, etc. In an embodiment, provider 130 can communicate with analytics module 142 to adjust the inspection level of the flow based on the results of a previous analysis.

Figure 3:
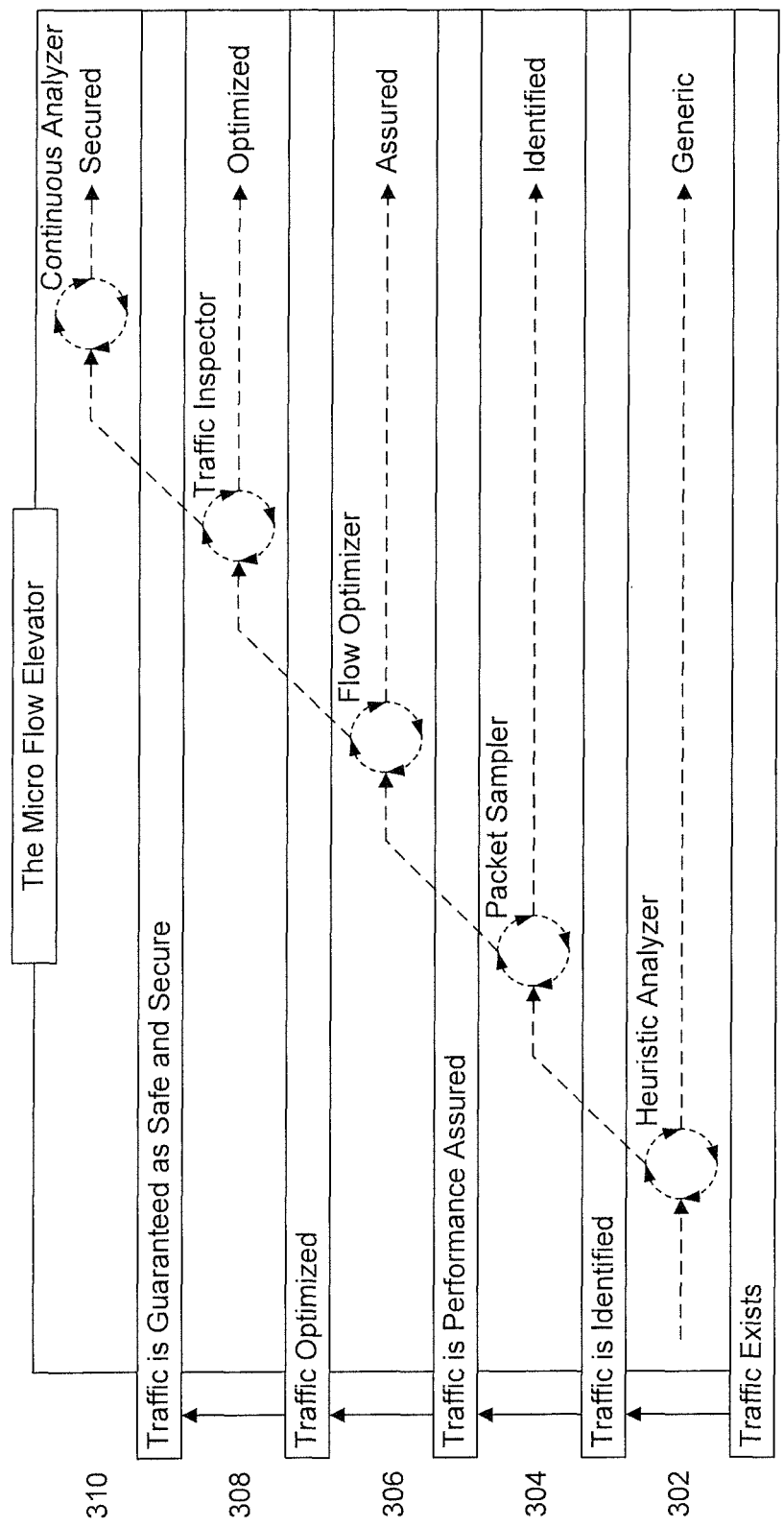
FIG. 3 shows a diagram illustrating the functionality of different levels of flow analysis, according to an embodiment.

FIG. 3 shows a diagram illustrating the functionality of different levels of flow analysis, according to an example embodiment.

At level 302, no particular analysis is performed on the flow, and only a generic heuristic analysis for the flow's metadata is performed. For example, the analysis can include determining the average size of packets, number of packets, bytes transmitted, etc.

At level 304, packet sampling may be performed that can, for example, identify a microflow. At this level, the analysis can include looking at random samples of packet headers and determining if they meet certain criteria. For example, packet sampling can be used to identify a microflow to which a policy applies (e.g., Layer 3 and layer 4 IP, port, protocol information, even HTTP packets from a particular address). The policy may then be applied by controller 110.

At level 306, flow optimization may be performed that can, for example, look at an entire flow while assuring a level of performance. The performance level may be defined in an application performance database which, when the flow is identified and looked up from, may dictate a particular service level (guaranteed bandwidth, latency, jitter, packet loss, etc. . . . ) At this level, the analysis can include looking at the header of all packets in a flow or microflow to detect conditions that match policies or rules.

At level 308, traffic inspection may be performed that can, for example, look at the payload of some packets. For example, the analysis can include looking at the payload of random packets in a flow or microflow, and looking for attack patterns associated with a particular type of traffic.

At level 310, continuous analysis may be performed that can, for example, look at an entire flow or microflow. For example, the analysis can include looking at the header and payload of all packets in a flow or microflow, and detecting attack patterns associated with a particular type of traffic.

Figure 4:
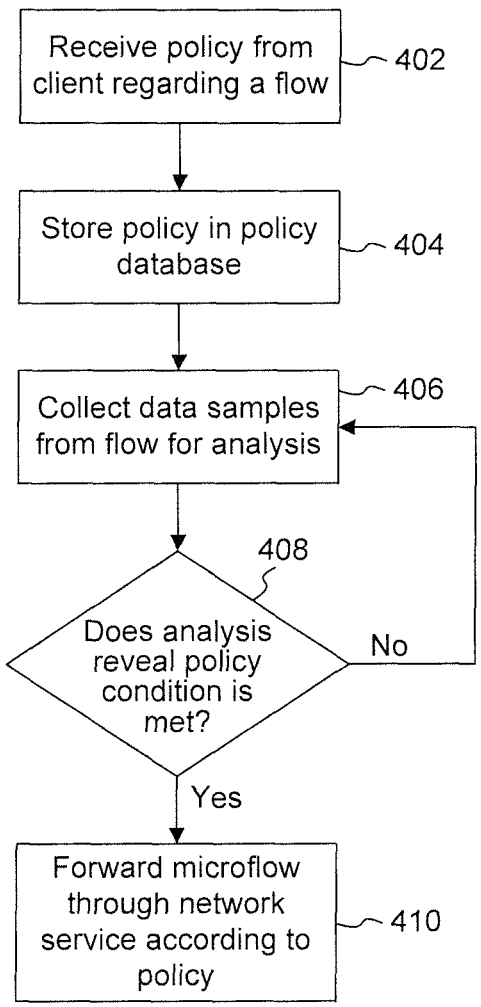
FIG. 4 is a flowchart illustrating a method of performing increased application of network resources to a micro-flow based on policies, according to an embodiment.

FIG. 4 is a flowchart illustrating a method 400 of performing increased application of network resources to a microflow based on policies, according to an example embodiment.

At step 402, the network receives a policy from a client regarding one or more of its network communications. A client can specify policies for all or some of its communications, based on parameters such as, for example, source and destination addresses (e.g., IP addresses), source and destination ports (e.g., TCP or UDP ports), protocol (e.g., HTTP, RTP), application, etc. In an embodiment, a network client may specify performance and security required for all or some of its communications. A client may provide a high level description of the performance or security desired for particular communications (e.g., high security for communications with ABC Corp., high throughput for communications XYZ Inc.), or may provide particular low level policy details (e.g., a particular IDS service for communications between particular IP addresses and ports).

At step 404, the network stores policies associated with client communications in a policy database. In an embodiment, the network creates low level policies based on high level input provided by the client, as described in step 402.

At step 406, the network collects data samples from a flow for analysis. In an embodiment, the network can collect a first packet from a new data flow and determine whether the flow satisfies a condition established in the policy database, as shown in step 408. For example, the network can determine based on analysis of the packet that the flow has a source and destination IP addresses that match a policy that specifies the flow must pass through an intrusion detection system.

If at step 408, the network determines the data flow satisfies a policy condition, the network adjusts its flow routes to forward the flow, or a microflow of the flow, according to the policy, as shown in step 410. For example, the network may adjust the routers' routing tables to route a microflow, such as, for example, the headers of the packets, through an intrusion detection system.

The network may continuously collect data from the flows to determine if policy conditions occur, as shown in the flowchart's return to step 406.

Figure 5:
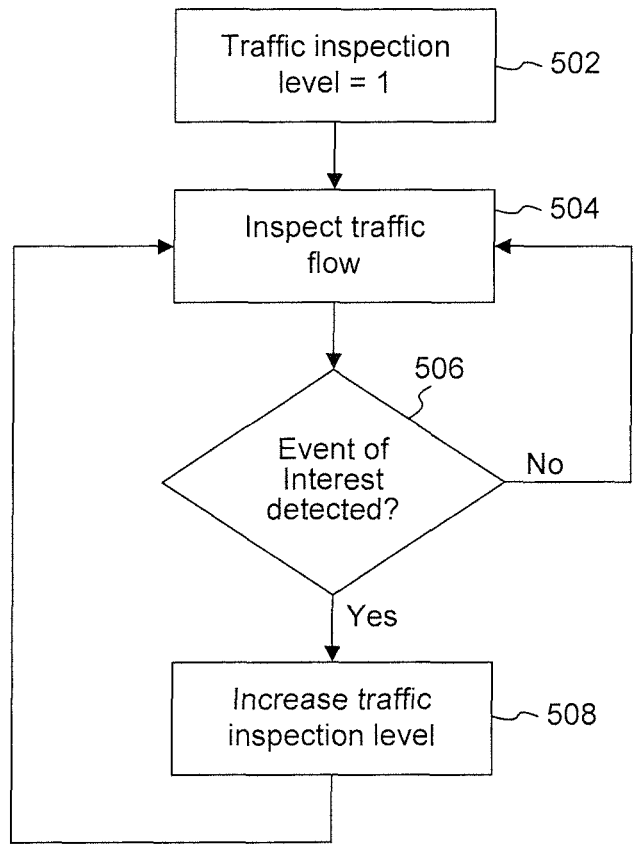
FIG. 5 is a flowchart illustrating a method for increasing the allocation of network resources to traffic flows in a network, according to an embodiment.

FIG. 5 is a flowchart illustrating a method 500 for increasing the allocation of network resources to traffic flows in a network, according to an example embodiment.

At step 502, the network may set the traffic inspection level of a flow to an initial level.

At step 504, the network may inspect the network traffic of the flow based on the inspection level set for flow. Inspecting the traffic may involve, for example, transmitting a portion of the flow, e.g., a microflow, through a network service. The transmitting may involve rerouting a portion of the flow, e.g., a microflow, through a network service or duplicating the packet flow through the network service in parallel. In an embodiment, at every higher inspection level, a larger portion of the flow is inspected and increased network resources are applied to inspecting the flow.

At step 506, the network may detect an event of interest in the flow. For example, an intrusion detection system may detect a sequence of packets in the flow that matches an attack pattern for compromising a particular type of server. When the network detects an event of interest, the network can increase the traffic inspection level of the flow, as show in step 508. Increasing the traffic inspection level of the flow may involve inspecting additional packets in the flow's sequence of packets at a higher level illustrated in FIG. 3 The network can then continue inspecting the flow, as shown in 504, at a high inspection level to further determine whether an attack is actually occurring and to handle it appropriately.

Similarly, the network may continue to monitor the flow to determine whether the event of interest continues. In the intrusion detection system example, the network may monitor to determine whether the flow continues to match the sequence matching the attack pattern. In examples where the event is tied to the size of the packets or a number or rate of packets in the data flow, the network may continue to monitor to determine whether the size, number or rate of the packets is outside of a normal range. When the event no longer exists, the network may decrease the level of inspection. By decreasing the level of inspection, additional packets in the flow's sequence of packets at a lower level illustrated in FIG. 3, thereby freeing up network resources to evaluate other areas of potential attack.

CONCLUSION

Policy database 144 may be any stored type of structured memory, including a persistent memory. In examples, a database may be implemented as a relational database or file system.

Each of the blocks and modules in FIGS. 1 and 2 may be implemented in hardware, software, firmware, or any combination thereof.

Each of the blocks and modules in FIGS. 1 and 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a nontransitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

What is claimed is:

1. A computer-implemented method of inspecting network traffic, comprising:
    determining that a traffic flow satisfies a first condition;
    transmitting a first portion of the traffic flow to a network service based on the determining the traffic flow satisfies the first condition;
    inspecting, at the network service, the first portion of the traffic flow at a first level of detail based on the first condition;
    determining, based on the inspecting, that the traffic flow satisfies a second condition;
    transmitting a second portion of the traffic flow to the network service based on the determining the traffic flow satisfies the second condition;
    inspecting, at the network service, the second portion of the traffic flow at a second level of detail, wherein the inspecting at the second level of detail requires a different amount of computing resources than the inspecting at the first level of detail
    wherein the second portion of the traffic flow comprises a larger amount of information than the first portion of the traffic flow.

2. The method of claim 1, further comprising:
    wherein the first condition comprises one of a heuristic, a policy associated with the traffic flow, or an event of interest.

3. The method of claim 1, further comprising:
    wherein the second condition comprises one of a heuristic, a policy associated with the traffic flow, or an event of interest.

4. The method of claim 1, wherein a first portion of a traffic flow comprises a random sample of packets.

5. The method of claim 1, further comprising:
    transmitting a third portion of the traffic flow to the network service based on the inspecting the traffic flow at the second level of detail;
    inspecting, at the network service, the third portion of the traffic flow at a third level of detail.

6. The method of claim 1, further comprising:
    determining that the traffic flow no longer satisfies the second condition; and
    when the traffic flow is determined to no longer satisfy the second condition, inspecting, at the network service, a third portion of the traffic flow at the first level of detail.

7. The method of claim 1, wherein the inspecting the second portion of the traffic flow at a second level of detail comprises performing an intrusion detection analysis.

8. The method of claim 1, wherein the first condition comprises a parameter associated with the traffic flow and a level of security desired for the traffic flow.

9. A system comprising:
    an analytics module configured to determine that a traffic flow satisfies a first condition;

a controller configured to configure one or more routers to:
  transmit a first portion of the traffic flow to a network service based on the determining the traffic flow satisfies the first condition;
a network service configured to:
  inspect the first portion of the traffic flow at a first level of detail based on the first condition; and
  determine, based on the inspecting, that the traffic flow satisfies a second condition;
wherein the controller is further configured to configure one or more routers to transmit a second portion of the traffic flow to the network service based on the determining the traffic flow satisfies the second condition,
wherein the network service is further configured to inspect the second portion of the traffic flow at a second level of detail, wherein the inspecting at the second level of detail requires a different amount of computing resources than the inspecting at the first level of detail, and
wherein the second portion of the traffic flow comprises a larger amount of information than the first portion of the traffic flow.

10. The system of claim 9, further comprising:
wherein the first condition comprises one of a heuristic, a policy associated with the traffic flow, or an event of interest.

11. The system of claim 9, further comprising:
wherein the second condition comprises one of a heuristic, a policy associated with the traffic flow, or an event of interest.

12. The system of claim 9, wherein a first portion of a traffic flow comprises a random sample of packets.

13. The system of claim 9, further comprising:
transmitting a third portion of the traffic flow to the network service based on the inspecting the traffic flow at the second level of detail;
inspecting, at the network service, the third portion of the traffic flow at a third level of detail.

14. The system of claim 9, wherein the inspecting the second portion of the traffic flow at a second level of detail comprises performing an intrusion detection analysis.

15. The system of claim 9, wherein the first condition comprises a parameter associated with the traffic flow and a level of security desired for the traffic flow.

16. The system of claim 9, wherein the network service is configured to determine that the traffic flow no longer satisfies the second condition, and when the traffic flow is determined to no longer satisfy the second condition, inspect, at the network service, a third portion of the traffic flow at the first level of detail.

17. A non-transitory computer-readable medium having instructions stored thereon that, when executed by at least one computing device, causes the at least one computing device to perform operations comprising:
  determining that a traffic flow satisfies a first condition;
  transmitting a first portion of the traffic flow to a network service based on the determining the traffic flow satisfies the first condition;
  inspecting, at the network service, the first portion of the traffic flow at a first level of detail based on the first condition;
  determining, based on the inspecting, that the traffic flow satisfies a second condition;
  transmitting a second portion of the traffic flow to the network service based on the determining the traffic flow satisfies the second condition;
  inspecting, at the network service, the second portion of the traffic flow at a second level of detail, wherein the inspecting at the second level of detail requires a different amount of computing resources than the inspecting at the first level of detail,
  wherein the second portion of the traffic flow comprises a larger amount of information than the first portion of the traffic flow.

18. The computer-readable medium of claim 17, further comprising:
wherein the first condition comprises one of a heuristic, a policy associated with the traffic flow, or an event of interest.

19. The computer-readable medium of claim 17, further comprising:
wherein the second condition comprises one of a heuristic, a policy associated with the traffic flow, or an event of interest.

* * * * *